No. 821,369. PATENTED MAY 22, 1906.
J. MORAN.
CORN TURNER.
APPLICATION FILED MAR. 2, 1906.

Witnesses:
Wm P. Bond
Frances W. Frost

Inventor:
John Moran
By Banning & Banning
Attys.

UNITED STATES PATENT OFFICE.

JOHN MORAN, OF CHICAGO, ILLINOIS.

CORN-TURNER.

No. 821,369.

Specification of Letters Patent.

Patented May 22, 1906.

Application filed March 2, 1906. Serial No. 303,835.

*To all whom it may concern:*

Be it known that I, JOHN MORAN, a citizen of the United States, residing at Chicago, in the county of Cook and State of Illinois, have invented certain new and useful Improvements in Corn-Turners, of which the following is a specification.

In the farming of wheat it is frequently the practice to plant the wheat intermediate the rows of corn in a corn-field, and the drilling or planting operation is usually carried on in the fall while the corn is still standing, and great difficulty is often experienced in pushing or turning back the corn to provide an unimpeded passage for the horse drawing the drill, and this pushing or turning of the corn usually requires the services of one or more additional men, who precede the horse and push back the corn to prevent the horse from trampling down or breaking the corn, which would not only injure it, but impede the progress of the wheat-drill through the corn-field. This corn-turning operation is not only difficult and arduous, but is slow and necessitates employment of additional farm-hands during a season when labor is ordinarily otherwise employed, for which reasons, among others, the operation of planting the wheat in the corn-field is difficult and unsatisfactory.

The object of the present invention is to provide an implement adapted to be attached in front of a horse by which the corn will be readily and automatically turned back out of the way of the advancing horse in much the same manner that snow is turned back in front of a snow-plow. The implement is adapted to be rigidly secured to the hame and other harness attachments and is so positioned and secured as not to interfere in any way with the movements of the horse, and the weight of the implement is so distributed as not to be felt to any appreciable extent by the horse when drawing the wheat-drill.

Another object of the invention is to so secure the implement that it may be readily attached to or detached from the horse, thereby allowing the implement itself to be housed near the point of usage and allowing the horse to proceed to and from the field unimpeded by the corn-turner.

The device is so constructed as to be strong, light, and serviceable and is so proportioned as to protect the legs and breast of the horse from the corn and to brush aside the corn at all points where it is likely to interfere with the progress of the horse. The invention consists in the features of construction and combination of parts hereinafter described and claimed.

Figure 1:
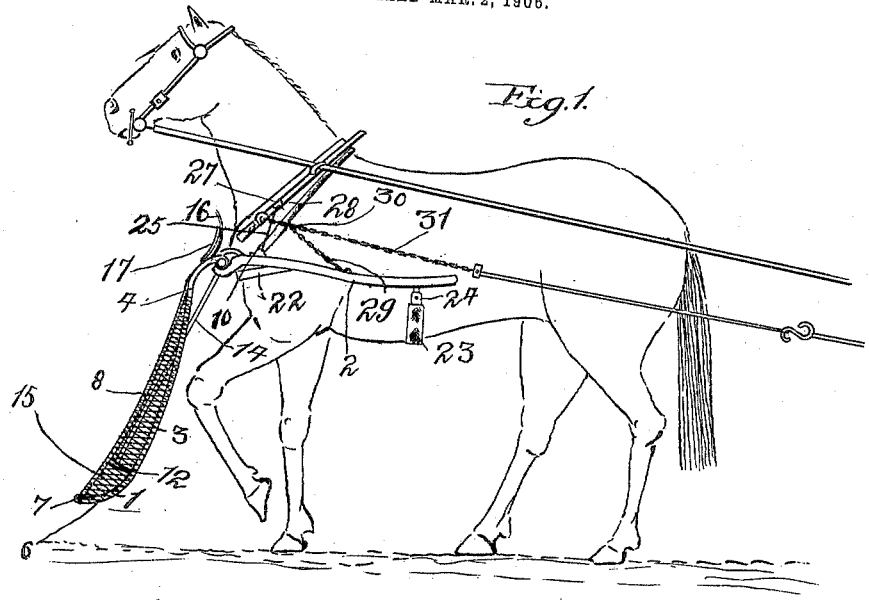
Figure 2:
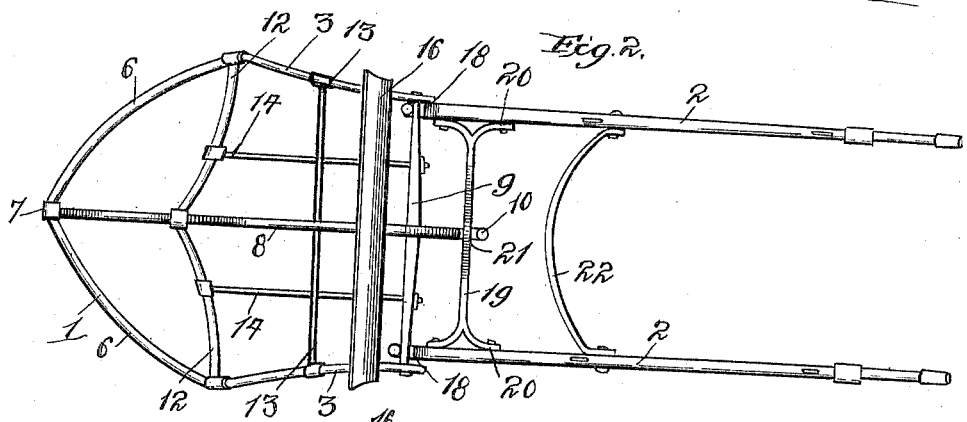
Figure 3:
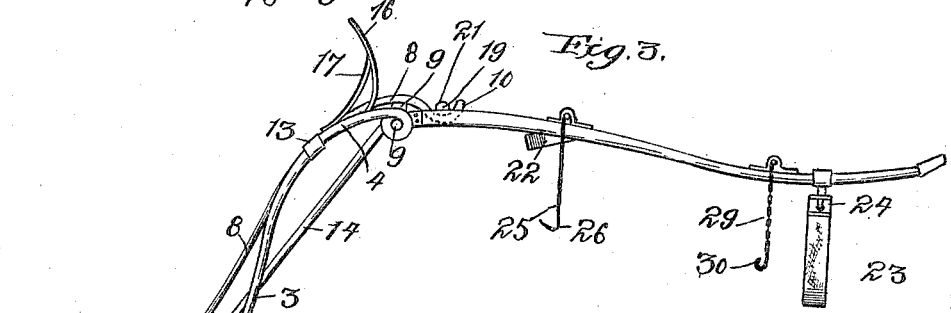

In the drawings illustrating the invention, Figure 1 is a view showing the implement secured to a horse in operative position; Fig. 2, a top or plan view of the implement, and Fig. 3 a side elevation of the same.

The implement consists, essentially, of a wedge-shaped fender 1 and attaching-shafts 2. The wedge-shaped fender comprises side bars 3, having rearwardly-curved ends 4, terminating in loops 5, and the lower and forward ends of the side bars 3 are forwardly bent or turned to provide bottom rails 6, converging to a point 7 in the center and lowermost part of the implement. The side rails are preferably composed of light rods or piping sufficiently strong to withstand considerable strain without bending or buckling, but of such light weight as not to constitute a burden to the horse. The fender further comprises a center bar 8, which forms the apex or edge of the wedge-shaped fender, and said center bar is secured at its lower end to the point 7 and is secured at its upper end to the center of a pivotal cross-rod 9. The upper end 10 of the center bar is rearwardly bent or curved to conform in a general way to the curvature of the ends 4 of the outer side bars, and the end 10 terminates in a U-shaped hook. (Best shown in Fig. 3.) The framework of the fender is braced near its lower end by lower cross-rails 12, secured to the side and center rods, respectively, and upper cross-rails 13 similarly secured. The framework is further braced by means of brace-rods 14, secured at their lower ends to the lower cross-rods 12 and at their upper ends to the pivotal cross-bar 9. This arrangement insures a firm rigid bracing of the bars, which is necessary to prevent bending or buckling during the progress of the horse through the corn. The framework is covered by a wire mesh 15, which conforms to the general wedge shape of the framework and prevents the falling of ears or leaves of corn through the framework and in front of the horse's feet.

To the upper portion of the framework is secured a forwardly-curving breastplate 16, which projects upwardly in front of the breast and neck of the horse and is braced by means of brackets 17, secured to the curved upper ends 4 of the side rods of the framework.

The fender-framework and breastplate are secured to the horse by means of the side shafts 2, which are adapted to extend back to the middle of the horse, and the forward ends of the shafts are provided with U-shaped sockets 18, which are adapted to hook under the pivotal cross-rod 9 of the framework, and the shafts are connected rearwardly of the hooks by a cross-brace 19, having forked attaching ends 20 and having in its center an arcuate bend 21, under which the hooked end 11 of the center rod or brace of the fender-framework is adapted to hook, so that the fender-framework will be rigidly held by the shafts and supported by its own weight in operative position. The shafts are further provided with a forwardly-bowed breast-bar 22, pivoted at its ends to the shafts and adapted to have its center freely movable to adjust itself to the breast formation of the horse to which the implement is secured. Near the rear ends of the shafts is a belly-band 23, adapted to be adjusted by means of a buckle 24 for securing the ends of the shafts in suitable position near the middle of the horse. The implement is supported near its forward end by means of supporting-rods 25, provided at their ends with hooks 26, adapted to hook into eyes 27, riveted or otherwise secured to the hame 28 of the horse. The shafts are further held by means of brace-chains 29 near the ends of the shafts provided with hooks 30, adapted to hook into any one of the links of the trace-chain 31.

In use the implement is secured to the horse by hooking the shaft-supporting rods onto the hame and adjusting the belly-band onto the horse, after which the brace-chains 29 are hooked to the traces to prevent rearward displacement of the shafts. After the shafts have been thus secured the fender is secured in place by raising the lower end sufficiently to allow the hooked end 11 to be passed under the arcuate bend 21 of the cross-brace 19, and simultaneously the fender ends of the shafts are slipped into place under the ends of the cross pivotal rod 9, after which the end of the fender is lowered, and the weight of the fender tends to hold the framework rigidly in position on the ends of the shafts. Furthermore, the weight of the implement tends to raise the free ends of the shafts, tightly drawing the belly-band against the body of the horse, and this support, in combination with the support afforded by the rods 25, prevents any dropping or sagging of the fender and holds its end clear of the ground and sufficiently forward to allow free and uninterrupted movement of the horse's forelegs. As the horse travels through a field of corn the stalks and leaves will be brushed aside or turned out of the way by the action of the fender, and contact with the horse's breast will be prevented by the breastplate, which not only allows unimpeded movement to the horse, but also prevents the corn from being trampled and destroyed by the passage of the horse and the wheat-drill. After the drilling operation is completed the fender can be removed from the shafts and suitably housed in close proximity to the field, and the shafts can be allowed to remain on the horse, if desired, since they will interfere in no way with the movements of the horse when being led back to the stable.

The facility of securing and removing the fender adds greatly to the usefulness of the implement, since it can be immediately taken off where the condition of the ground or the absence of necessary room in turning necessitates its removal and can be inserted into place without the least difficulty when the conditions are proper for its further employment. The method of constructing and reinforcing the framework is one which results in a firm, strong, and rigid structure and one adapted for long and continued usage without injury. The method by which the device is secured to the horse prevents wabbling, shaking, or lateral movement of the implement, and consequently affords the rigidity necessary in turning back the corn out of the way.

What I claim as new, and desire to secure by Letters Patent, is—

1. An implement of the class described, comprising a fender, and means for removably securing the fender in front of a horse and in position to allow freedom of movement of the horse, substantially as described.

2. An implement of the class described, comprising shafts adapted to be secured to the harness of a horse, and a fender adapted to be removably secured to the forward projection of the shafts and held in front of the horse in position to allow freedom of movement of the horse, substantially as described.

3. An implement of the class described, comprising shafts, a belly-band adapted to hold the rear ends of the shafts in position, means for supporting the forward ends of the shafts from the hame of the horse, and a fender adapted to be removably secured to the forwardly-projecting ends of the shafts and held in position in front of the horse to allow freedom of movement of the horse, substantially as described.

4. An implement of the class described, comprising shafts, a belly-band adapted to hold the rear ends of the shafts in position, means for supporting the forward ends of the shafts from the hame of the horse, a fender of wedge-shaped formation having a framework comprising side bars converging to a point at their lower forward ends, a center bar, and a mesh covering for the framework, the framework being removably secured to the forwardly-projecting ends to allow freedom of movement of the horse, substantially as described.

5. In an implement of the class described, the combination of shafts, a cross breast-bar connecting the shafts, a belly-band adapted to secure the rear ends of the shafts, a support connecting the shafts with the hame of the horse, sockets at the forward ends of the shafts, a cross brace-rod connecting the shafts rearwardly of the sockets, a fender-framework of wedge-shaped formation comprising side rails and a center rail, a pivotal cross-bar connecting the upper ends of the side rails, a hook on the upper end of the center rail and adapted to be hooked under the cross-brace for the shafts, and the sockets on the ends of the shafts being adapted to be hooked under the pivotal cross-bar of the frame, substantially as described.

6. In an implement of the class described, the combination of shafts, a cross breast-bar connecting the shafts, a belly-band adapted to secure the rear ends of the shafts, a support connecting the shafts with the hame of the horse, sockets at the forward ends of the shafts, a cross brace-rod connecting the shafts rearwardly of the sockets, a fender-framework of wedge-shaped formation comprising side rails and a center rail, a pivotal cross-bar connecting the upper ends of the side rails, a hook on the upper end of the center rail and adapted to be hooked under the cross-brace for the shafts, and the sockets on the ends of the shafts being adapted to be hooked under the pivotal cross-bar of the frame, lower cross-rods connecting the center and side rails of the frame, and brace-rods connecting the lower cross-rods with the pivotal cross-bar, substantially as described.

7. In an implement of the class described, the combination of shafts, a cross breast-bar connecting the shafts, a belly-band adapted to secure the rear ends of the shafts, a support connecting the shafts with the hame of the horse, sockets at the forward ends of the shafts, a cross brace-rod connecting the shafts rearwardly of the sockets, a fender-framework of wedge-shaped formation comprising side rails and a center rail, a pivotal cross-bar connecting the upper ends of the side rails, a hook on the upper end of the center rail and adapted to be hooked under the cross-brace for the shafts, and the sockets on the ends of the shafts being adapted to be hooked under the pivotal cross-bar of the frame, lower cross-rods connecting the center and side rails of the frame, brace-rods connecting the lower cross-rods with the pivotal cross-bar, and a mesh covering for the frame, substantially as described.

JOHN MORAN.

Witnesses:
SAMUEL W. BANNING,
WALKER BANNING.